(12) United States Patent
Fraley et al.

(10) Patent No.: US 8,186,139 B1
(45) Date of Patent: May 29, 2012

(54) MOWER WITH LONGITUDINAL BAFFLES

(75) Inventors: J. Phillip Fraley, Winfield, AL (US);
John W. Davis, III, Winfield, AL (US)

(73) Assignee: King Kutter, Inc., Winfield, AL (US)

( * ) Notice: Subject to any disclaimer, the term of this patent is extended or adjusted under 35 U.S.C. 154(b) by 163 days.

(21) Appl. No.: 12/795,097

(22) Filed: Jun. 7, 2010

Related U.S. Application Data

(60) Provisional application No. 61/184,494, filed on Jun. 5, 2009.

(51) Int. Cl.
*A01D 67/00* (2006.01)
(52) U.S. Cl. .............................. 56/320.1; 56/6; 56/320.2
(58) Field of Classification Search .................... 56/6, 7, 56/15.8, 16.9, 255, 320.1, 320.2
See application file for complete search history.

(56) References Cited

U.S. PATENT DOCUMENTS

| | | | | |
|---|---|---|---|---|
| 4,226,074 | A | * | 10/1980 | Mullet et al. ................. 56/320.2 |
| 2007/0068133 | A1 | * | 3/2007 | Kure et al. .................... 56/320.1 |
| 2009/0126330 | A1 | * | 5/2009 | Moore et al. ..................... 56/255 |

* cited by examiner

*Primary Examiner* — Thomas B Will
*Assistant Examiner* — Mai Nguyen
(74) *Attorney, Agent, or Firm* — Angela Holt; Bradley Arant Boult Cummings LLP

(57) ABSTRACT

A rotary mower with a plurality of cutting blades is provided. The deck comprises two longitudinal baffles that direct grass clippings to the rear of the mower. The longitudinal baffles, in conjunction with right and left side blade guards, form three channels. A cutting blade is disposed within each channel. A lift frame assembly comprises swiveling linkages that allow rotation of the deck with respect to the trailer hitch.

8 Claims, 4 Drawing Sheets

MOWER WITH LONGITUDINAL BAFFLES

CROSS-REFERENCE TO RELATED APPLICATIONS

This application claims the benefit of U.S. Provisional Application No. 61/184,494 filed on Jun. 5, 2009, the entire contents of which are herein incorporated by reference.

FIELD OF THE INVENTION

The present invention relates generally to the field of tractor-based, rotary-driven power equipment, and more particularly relates to a finish mower.

BACKGROUND AND SUMMARY OF THE INVENTION

Most rotary mowers include shrouds that partially surround the cutting blades. The shrouds comprise extensions extending generally perpendicularly from the deck. Some of these shrouds are rounded and closely follow the outline of the cutting blades, spaced apart from the cutting blades by a small gap.

A mower according to the present invention comprises longitudinal channels between the multiple blades of the mower. The channels prevent grass clippings from one blade from interfering with the cutting action of the other blades. In one embodiment, the mower deck comprises three blades with longitudinal baffles between the blades that direct grass clippings to the rear of the mower.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

DETAILED DESCRIPTION

Figure 1:
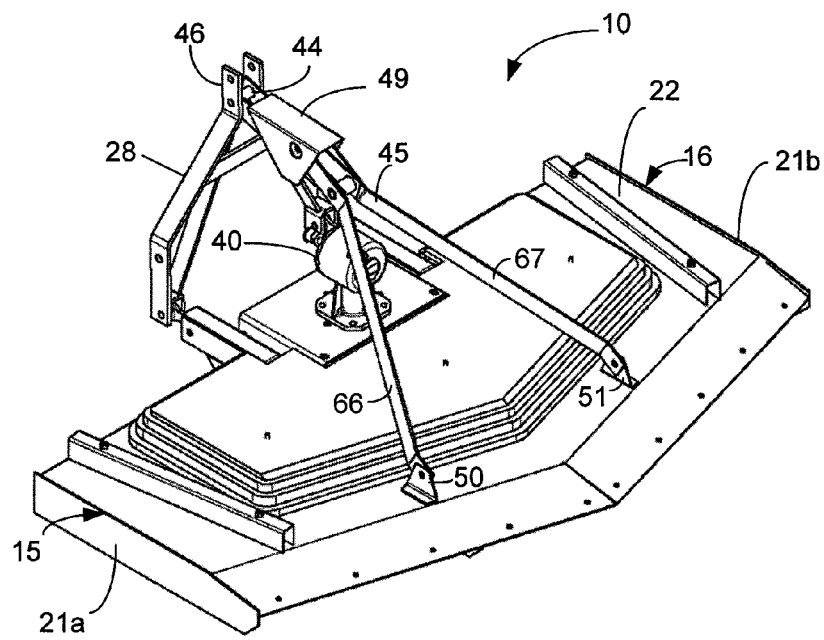
FIG. 1 is a rear perspective view of an exemplary mower in accordance with the present disclosure.

FIG. 1 depicts a rear perspective view of a mower 10 according to one embodiment of the present disclosure. The mower 10 comprises a cutting deck 22, which is fabricated from stainless steel in one embodiment. In other embodiments, the deck 22 is fabricated from other suitable strong and rigid materials.

Two side blade guards 21a and 21b are disposed on the sides 15 and 14 of the deck 22, respectively. In one embodiment, the side blade guards 21a and 21b are comprised of a generally vertically-oriented strip of metal welded along the sides 15 and 14 of the deck 22.

A gearbox 40 operates the cutting blades (not shown) on the underside (not shown) of the deck 22. A shaft (not shown) connects the gearbox 40 to a tractor (not shown) to transfer rotation from the tractor to the blades through the gearbox 40.

The mower 10 further comprises a lift frame 28 rotatably affixed to the deck 22. The lift frame 28 connects the mower 10 to the tractor (not shown). The lift frame 28 is generally A-shaped and provides a standard three-point hitch connection to the tractor, as further discussed herein.

A pivot bar assembly 44 and a pivot brace assembly 45 connect a top end 46 of the lift frame 28 to the deck 22. In this regard, the pivot bar assembly 44 is rotatably connected between the top end 46 of the lift frame 28 and the pivot brace assembly 45. The pivot brace assembly 45 is rotatably connected to the deck 22. A pivot shield 49 covers the pivot bar assembly 44.

The pivot brace assembly 45 is comprised of two angled legs 66 and 67 rotatably affixed to two pivot brace brackets 50 and 51 at their lower ends. In one embodiment, the pivot brace brackets 50 and 51 comprise a short angle iron welded to the deck 22.

At their top ends, the angled legs 66 and 67 are affixed to the pivot bar assembly 44. The pivot bar assembly 44 is comprised of two pivot bars (not shown) rotatably affixed to the angled legs 66 and 67. The pivot shield 49 partially covers the pivot bars.

Figure 2:
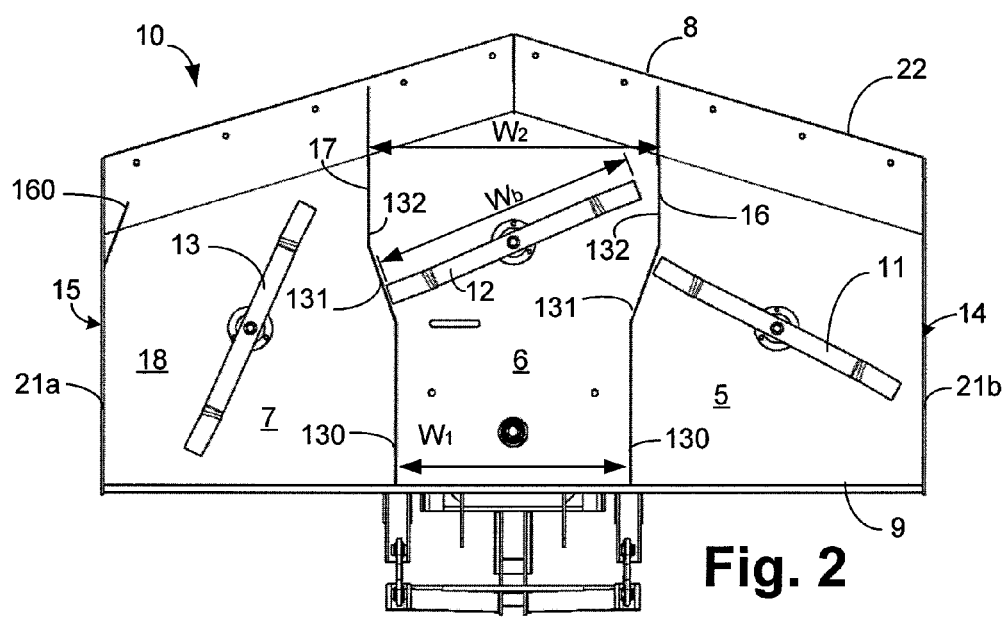
FIG. 2 is a bottom plan view of the mower of FIG. 1.

FIG. 2 depicts a bottom view of the deck 22. In this embodiment, the mower 10 has three blades 11, 12, and 13. Other embodiments may have a different number of blades. The outer blades 11 and 13 are located near the outer right side 14 and outer left side 15 of the deck 22, respectively. The middle blade 12 is located generally in the central portion of the deck 22, as illustrated.

The outer blades 11 and 13 are disposed frontwardly (i.e., towards a front side 9 of the deck 22) with respect to the middle blade 12. The middle blade 12 is thus offset from, and not aligned with, the outer blades 11 and 13, in the transverse direction. This offset configuration permits the three blades to 11, 12 and 13 to cut a wide swath of grass (not shown) between the outermost edges of the outermost blades 11 and 13 without leaving any uncut areas, as further discussed herein.

Baffles 16 and 17 extend longitudinally down the deck 22 from the front side 9 of the deck 22 to a rear side 8 of the deck 22. The right baffle 16 is disposed between the outer blade 11 and the middle blade 12. The left baffle 17 is disposed between the outer blade 13 and the middle blade 12.

The baffles 16 and 17 comprise thin projections that extend generally perpendicularly from an underside 18 of the deck 22 and define three channels, outer channels 5 and 7 and inner channel 6, as illustrated. In this regard, channel 5 is bounded by the right side blade guard 21b, the underside 18 of the deck 22, and the baffle 16. Channel 6 is bounded by the baffles 16 and 17 and the underside 18 of the deck 22. Channel 7 is bounded by the baffle 17, the underside 18 of the deck 22, and the left side blade guard 21a.

The channels 5, 6, and 7 are generally longitudinally directed and are generally aligned with the direction of motion of the mower 10 during operation. In operation of the mower 10, the three channels 5, 6, and 7 direct grass clippings (not shown) to the rear side 8 of the mower 10.

The baffles 16 and 17 are generally mirror-images of each other, and each of the baffles 16 and 17 is a unitary piece bent into three "segments," a front segment 130, a middle segment 131, and a rear segment 132. The front segments 130 of the baffles 16 and 17 are generally parallel to the sides 14 and 15 of the deck 22 and are spaced apart at a width "W1" that is less than the width "Wb" of the blade 12. The rear segments 132 of the baffles 16 and 17 are generally parallel to the sides 14 and 15 of the deck 22 and are spaced apart at a width "W2" that is greater than the width Wb of the blade 12. The distance between the baffles 16 and 17 thus is larger at the rear side 8 of the mower 10.

The baffles 16 and 17 are generally welded to the underside 18 of the deck 22. In one embodiment, the baffles 16 and 17 are formed from 12 gauge stainless steel.

A deflector 160 extends inwardly from the inner side of the left blade guard 21a. The deflector 160 is angled as shown and deflects grass (not shown) from accumulating at the right edge 15 of the mower 10.

Figure 3:
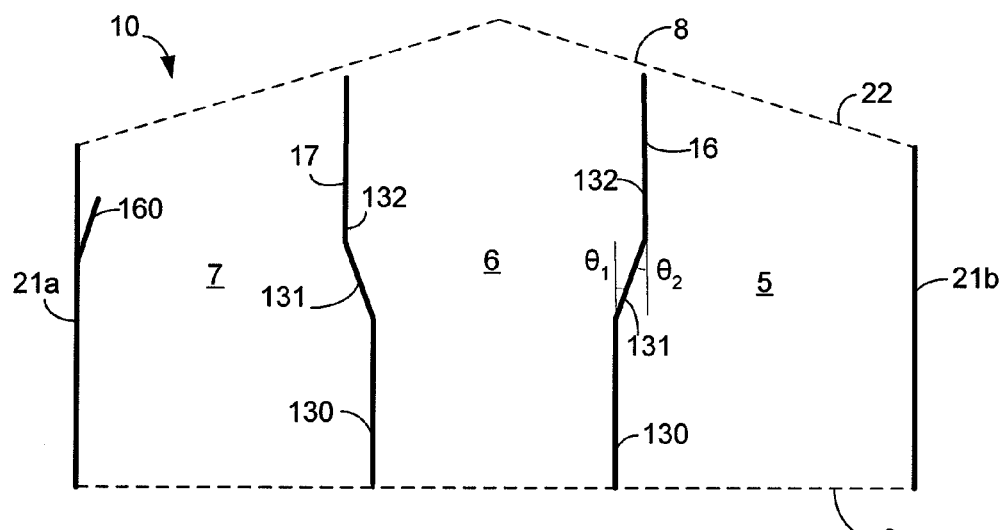
FIG. 3 is a partial bottom view of the mower of FIG. 1.

FIG. 3 is a partial view of the underside of the mower 10 further illustrating the channels 5, 6, and 7 that direct grass clippings (not shown). As was discussed above, the baffle 16 is bent into three "segments," a front segment 130, a middle segment 131, and a rear segment 132. The front segment 130 is bent at an angle $\theta_1$ with respect to the middle segment 131. Likewise, the rear segment 132 is bent at an angle $\theta_2$ with respect to the middle segment 131. In the illustrated embodiment, $\theta_1$ and $\theta_2$ are twenty (20) degrees. The front segment 130 and the rear segment 132 are parallel to one another in this embodiment.

Figure 4:
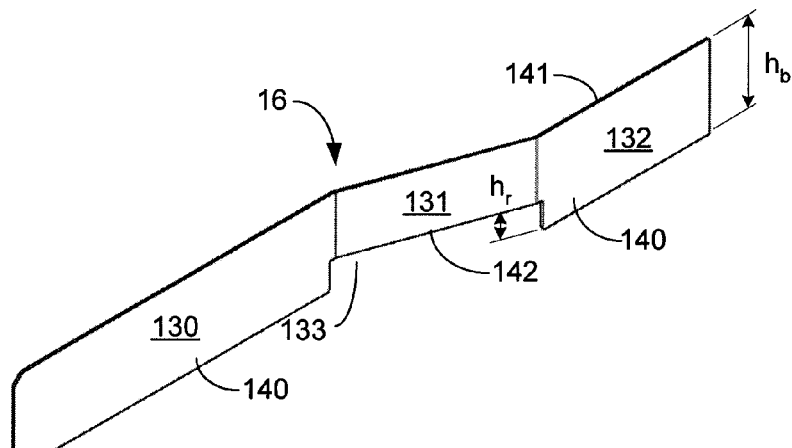
FIG. 4 is a perspective view of a baffle according to an embodiment of the present disclosure.

FIG. 4 is a perspective view of exemplary right baffle 16 in accordance with an embodiment of the disclosure. The baffle 16 has a top edge 141 that is generally straight, for welding to the underside 18 of the deck 22 (FIG. 2). The baffle 16 is bent into three segments 130, 131, and 132, as discussed above. The baffle 16 has a bottom edge 140 that recesses at a recessed edge 142 at the middle segment 131 to create an open space 133. The baffle 16 is fabricated from stainless steel in one embodiment, but may be fabricated from other materials in other embodiments.

The height $h_b$ of the baffle 16 is 4 and ⅜ inches in one embodiment, and the height $h_r$ of the open space 133 between the bottom edge 140 and the recessed edge 142 is 1 and ⅜ inches in one embodiment.

Figure 5:
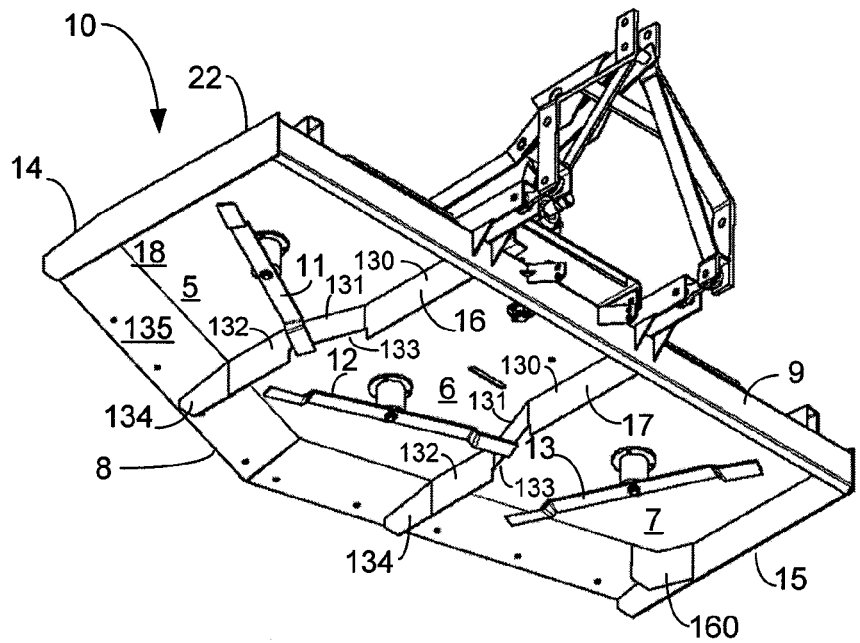
FIG. 5 is a bottom perspective view of the mower of FIG. 1.

FIG. 5 is a bottom perspective view of the deck 22. The middle segments 131 of the baffles 16 and 17 are shorter (in the vertical direction) than the front segments 130 and the rear segments 132, such that there is an open space 133 defined, as illustrated and as further discussed herein. The open spaces 133 prevent the blades 11-13 from contacting the baffles 16 and 17 during rotation of the blades 11, 12 and 13. In the illustrated embodiment, the position of the blades 11, 12 and 13 allows for a gap of about ½ inch between any two adjacent blades.

A rear edge 135 of the deck 22 angles downwardly to help direct the grass clippings (not shown) downwardly. A flexible plastic or rubber guard (not shown) connects to the rear edge 135 and angles further toward the ground (not shown).

In the illustrated embodiment, the rear ends 134 of the baffles 16 and 17 comprise separate segments that are welded to the unitary baffles 16 and 17. The rear ends 134 further abut and are welded to the angled rear edge 135 of the deck 22.

Figure 6:
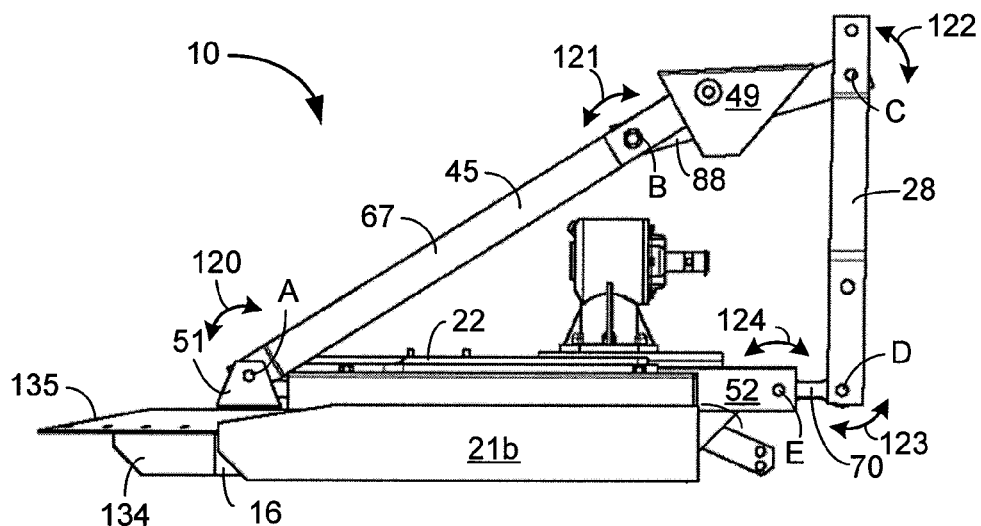
FIG. 6 is a right side view of the mower of FIG. 1.

FIG. 6 is a right side view of the mower 10 of FIG. 1. The rear edge 135 is shown angled downwardly, as discussed above. The angle of the rear edge 135 with respect to the deck 22 surface is 11 degrees in one embodiment.

In operation of the mower 10, the angled leg 67 of the pivot brace assembly 45 is rotatable around point "A" (i.e., the joint between the leg 67 and the bracket 51), in the direction indicated by direction arrow 120. The angled leg 67 is rotatably affixed to a pivot bar 88 such that the leg 67 and bar 88 may rotate around a point "B" (i.e., the joint between the leg 67 and the bar 88) in the direction indicated by direction arrow 121. Though not pictured, another angled leg is mirror imaged to leg 67 and rotates in the same manner. The pivot bar 88 and the lift frame 28 are rotatable around a point "C" (i.e., the joint between the bar 88 and the frame 28) in the direction indicated by direction arrow 122.

A swivel linkage 70 rotatably connects the deck 22 to the lift frame 28. The swivel linkage 70 and the lift frame 28 are rotatable around a point "D" (i.e., the joint between the swivel linkage 70 and the lift frame 28) in the direction indicated by direction arrow 123.

The swivel linkage 70 also rotates with respect to a box 52 that connects the deck 22 to the swivel linkage 70. In this regard, the swivel linkage 70 and the bracket 52 are rotatable around point "E" (i.e., the joint between the swivel linkage 70 and the bracket 52) in the direction indicated by direction arrow 124.

Figure 7:
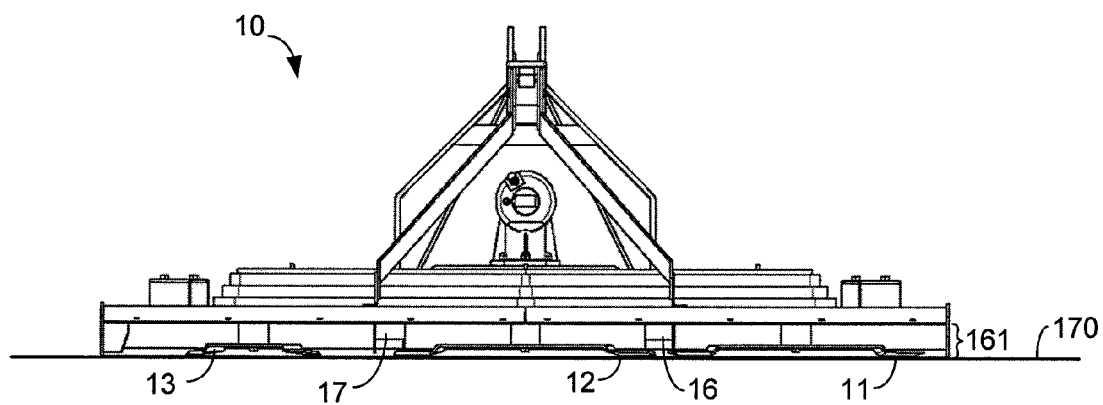
FIG. 7 is a rear plan view of the mower of FIG. 1.

FIG. 7 is a rear plan view of the mower 10 of FIG. 1. A gap 161 between the rear side 8 of the deck 22 and the ground (not shown) allows grass clippings (not shown) to exit the rear of the mower. The baffles 16 and 17 extend down toward, but do not contact, the ground.

What is claimed is:

1. A mower comprising:
    a deck having a rear side and a front side, the front side comprising a lift frame for attaching the deck to a tractor;
    right and left side blade guards extending generally perpendicularly from opposed sides of the deck;
    two baffles, a first baffle and a second baffle, each baffle extending generally perpendicularly and longitudinally from the front side of the deck to the rear side of the deck;
    three cutting blades, a left blade, a center blade, and right blade, in which the left blade is separated from the center blade by the first baffle and the center cutting blade is separated from the right blade by the second baffle; and
    a longitudinally-directed center channels, the center channel formed by the first baffle and the second baffle,
    wherein the center channel has a width that increases from the front side of the deck to the rear side of the deck and wherein at no point from the front side of the deck to the rear side of the deck does the width decrease.

2. The mower of claim 1 wherein the right baffle and the left baffle each comprise a front segment, a middle segment, and a rear segment.

3. The mower of claim 2, wherein the front segments of the right and left baffles are generally parallel.

4. The mower of claim 3, wherein the rear segments of the right and left baffles are generally parallel.

5. The mower of claim 4, wherein the middle segments of the right and left baffles are angled outwardly from the front segments to the rear segments.

6. The mower of claim 1, wherein the left side blade guard comprises an angled deflector.

7. A mower, comprising:
    a left blade, a center blade, and a right blade;
    a first side guard positioned on a first outer edge of a deck to the left of the left blade;
    a second side guard positioned on a second outer edge of the deck, opposing the first side guard and to the right of the right blade, wherein the first side guard and the second side guard extend from a front edge of the deck to a back edge of the deck substantially in parallel with one another;

a first baffle between the left blade and the center blade, the first baffle comprising contiguous sections including a first straight section, a first angled section, and a second straight section, wherein the first straight section and the second straight section are substantially parallel, and the first straight section extends from the front edge of the deck and is contiguous with a first end of the first angled section and the second straight section extends from the back edge of the deck and is contiguous with a second end of the first angled section, and the first straight section is disposed inwardly from the second straight section such that the first angled section angles outwardly between the first straight section and the second straight section; and a second baffle between the right blade and the center blade, the second baffle comprising contiguous sections including a third straight section, a second angled section, and a fourth straight section, wherein the third straight section and the fourth straight section are substantially parallel, and the third straight section extends from the front edge of the deck and is contiguous with a first end of the second angled section and the fourth straight section extends from the back edge of the deck and is contiguous with a second end of the second angled section, and wherein the third straight section is disposed inwardly from the fourth straight section such that the second angled section angles outwardly between the third straight section and the fourth straight section, wherein the first baffle and the second baffle form a center channel in which is disposed the center blade, the center blade is coupled to the underside of the deck at a first distance from the front edge of the deck, the left blade and the right blade are coupled to the underside of the deck at a second distance from the front edge of the deck, and the first distance is greater than the second distance, and wherein the center channel has a width that increases from the front side of the deck to the rear side of the deck and at no point from the front side of the deck to the rear side of the deck does the width decrease.

8. The mower of claim 7, wherein the first side guard comprises a deflector that is contiguous with the first side guard and that extends inwardly toward the left blade.

* * * * *